(12) United States Patent
Ostino et al.

(10) Patent No.: US 11,286,788 B2
(45) Date of Patent: Mar. 29, 2022

(54) BLADE FOR A TURBOMACHINE TURBINE, COMPRISING INTERNAL PASSAGES FOR CIRCULATING COOLING AIR

(71) Applicant: SAFRAN AIRCRAFT ENGINES, Paris (FR)

(72) Inventors: Leandre Ostino, Moissy-Cramayel (FR); Patrice Eneau, Moissy-Cramayel (FR); Charlotte Marie Dujol, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 170 days.

(21) Appl. No.: 16/615,328

(22) PCT Filed: May 18, 2018

(86) PCT No.: PCT/FR2018/051205
§ 371 (c)(1),
(2) Date: Nov. 20, 2019

(87) PCT Pub. No.: WO2018/215718
PCT Pub. Date: Nov. 29, 2018

(65) Prior Publication Data
US 2020/0173290 A1 Jun. 4, 2020

(30) Foreign Application Priority Data
May 22, 2017 (FR) ...................... 17 54543

(51) Int. Cl.
*F01D 5/18* (2006.01)
*F02C 7/18* (2006.01)

(52) U.S. Cl.
CPC ............... *F01D 5/186* (2013.01); *F02C 7/18* (2013.01); *F05D 2260/202* (2013.01)

(58) Field of Classification Search
None
See application file for complete search history.

(56) References Cited

U.S. PATENT DOCUMENTS 7,481,623 B1    1/2009  Liang
8,573,923 B2 *  11/2013 Tibbott .................. F01D 5/186
                                                  415/115
(Continued)

FOREIGN PATENT DOCUMENTS

DE    1 601 563 A1   12/1970
FR    3 020 402 A1   10/2015
(Continued)

OTHER PUBLICATIONS

International Search Report dated Oct. 11, 2018 in PCT/FR2018/051205 filed on May 18, 2018.
(Continued)

*Primary Examiner* — Michael Lebentritt
(74) *Attorney, Agent, or Firm* — Oblon, McClelland, Maier & Neustadt, L.L.P.

(57) ABSTRACT

In order to limit the air flow required to cool its blade member, a blade for an aircraft turbomachine turbine includes, in its blade member, a main passage configured to collect a main air flow from an air inlet and to circulate it in the blade member, and a side passage located between the main passage and the pressure-side wall, while being separated from the main passage, wherein the side passage is configured to collect a side air flow from the air inlet and to circulate it in the blade member, the main passage having at least three portions connected together end-to-end to form a coil, the side passage being located between each of these portions and the pressure-side wall.

10 Claims, 4 Drawing Sheets

(56) References Cited

U.S. PATENT DOCUMENTS

| | | | |
|---|---|---|---|
| 8,585,365 B1 | 11/2013 | Liang | |
| 8,944,763 B2 * | 2/2015 | Lee | F01D 5/187 |
| | | | 416/97 R |
| 9,551,228 B2 * | 1/2017 | Propheter-Hinckley | |
| | | | F01D 5/187 |
| 10,060,269 B2 * | 8/2018 | Smith | F01D 5/187 |
| 10,221,696 B2 * | 3/2019 | Weber | F01D 5/187 |
| 10,267,162 B2 * | 4/2019 | Leary | F02C 7/18 |
| 10,815,791 B2 * | 10/2020 | Meier | F01D 5/147 |
| 10,895,168 B2 * | 1/2021 | Xu | F01D 5/187 |
| 2014/0322008 A1 | 10/2014 | Molter et al. | |
| 2016/0305253 A1 * | 10/2016 | Szijarto | F01D 5/187 |
| 2017/0101893 A1 * | 4/2017 | Marsh | F01D 5/18 |
| 2017/0183969 A1 | 6/2017 | Dujol et al. | |
| 2017/0268358 A1 * | 9/2017 | Lee | F01D 5/186 |
| 2017/0292384 A1 * | 10/2017 | Auxier | F01D 11/08 |
| 2018/0156043 A1 * | 6/2018 | Clum | F01D 9/02 |
| 2020/0182071 A1 * | 6/2020 | Spangler | F01D 5/189 |
| 2020/0291789 A1 * | 9/2020 | LoRicco | B22C 9/10 |
| 2021/0047932 A1 * | 2/2021 | Craig, III | F01D 5/187 |

FOREIGN PATENT DOCUMENTS

| | | |
|---|---|---|
| WO | WO 2014/055259 A1 | 4/2014 |
| WO | WO 2015/181497 A1 | 12/2015 |

OTHER PUBLICATIONS

Preliminary French Search Report dated May 17, 2018 in French Application No. 1754543 filed on May 22, 2017.

* cited by examiner

BLADE FOR A TURBOMACHINE TURBINE, COMPRISING INTERNAL PASSAGES FOR CIRCULATING COOLING AIR

TECHNICAL FIELD

The present invention relates to the field of aircraft turbomachines and more particularly relates to the cooling of the moving blades of the turbines within such turbomachines.

STATE OF PRIOR ART

Within a turbomachine used to propel an aircraft, turbine blades are subjected to high heat of the combustion gases from the combustion chamber. It is in particular the case of blades directly arranged at the outlet of the combustion chamber, such as the blades of a high pressure turbine in a multi-spool turbomachine.

To protect the blades from these high temperatures, it is known to cool the blades by means of an airflow circulating in cavities provided inside the airfoils of the blades. These cavities are generally supplied with relatively fresh air taken at a compressor stage of the turbomachine.

Document FR 3 020 402 A1 describes an example of internal configuration of a blade provided with such cavities.

However, the constant improvement in the aircraft engine performance results in an increase in the temperature of the combustion gases.

But, progress made as regards materials and coatings used to form the blades do not make it possible on their own to compensate for the rise in the temperature of the combustion gases.

Consequently, it is desirable to improve the cooling of the blades.

However, it is desirable in the same time to limit the airflow rate used to cool the blades.

Indeed, taking cooling air for the blades at a compressor of the turbomachine (typically the high pressure compressor in the case of a two-spool turbomachine) tends to degrade the general turbomachine performance, in particular in terms of specific consumption.

DISCLOSURE OF THE INVENTION

The purpose of the invention is in particular to provide a simple, economic and efficient solution to this problem.

To that end, it provides a blade for an aircraft turbomachine turbine, comprising a blade root comprising at least one air inlet, and an airfoil carried by the blade root and extending along a span direction of the blade terminating in an apex of the blade, the airfoil having a pressure side wall, and a suction side wall connected to the pressure side wall at a leading edge and a trailing edge of the airfoil.

The airfoil comprises in particular a main cavity configured to collect a main airflow from the air inlet and circulate it in the airfoil and exhaust it from the main cavity by first outlet ports, and a side cavity interposed between the main cavity and the pressure side wall by being separated from the main cavity, the side cavity being configured to collect a side airflow from the air inlet and circulate it in the airfoil and exhaust it from the side cavity by second outlet ports.

According to the invention, the main cavity includes at least three portions connected to each other end-to-end so as to form a serpentine shape, the side cavity being interposed between each of the portions and the pressure side wall.

In use, the main cavity thus enables a main airflow circulating in the same to follow a relatively long path, which makes it possible to maximise heat exchanges between this main airflow and the walls delimiting the main cavity, whereas the side cavity enables a heat shield to be formed between the entire main cavity and the pressure side wall, which is generally particularly hot, so as to limit heating of the main airflow through the pressure side wall. Consequently, the main airflow remains relatively fresh at the outlet of the main cavity and hence can be exploited to cool another portion of the airfoil, as will appear more clearly in what follows.

The invention thus generally makes it possible to limit the flow rate necessary as regards the main airflow circulating in the main cavity.

The side cavity is preferably a so-called "thin" cavity, that is having a low thickness in comparison with the main cavity. Thus, the mean thickness of the side cavity is preferentially lower than one third of the mean thickness of the main cavity.

In one preferred embodiment of the invention, the portions of the main cavity are adjacent to the suction side wall.

The main airflow circulating in the main cavity thus allows cooling of the suction side wall.

Preferably, the airfoil further comprises a leading edge cavity adjacent to the leading edge and separated from the air inlet.

In the preferred embodiment of the invention, the portions of the main cavity advantageously comprise a trailing edge side portion connected to the air inlet, a leading edge side portion connected to the leading edge cavity through the first outlet ports so as to supply the leading edge cavity with cooling air, and at least one intermediate portion connecting the trailing edge side portion to the leading edge side portion. In addition, the airfoil includes third outlet ports through which the leading edge cavity communicates with the outside of the blade.

The main airflow at the outlet of the main cavity can thus be exploited to cool the walls of the airfoil forming the leading edge.

Consequently, in the preferred embodiment of the invention, the pressure side wall, being relatively hot, is cooled by the side airflow which is exclusively used for cooling it, whereas the suction side wall, which is less hot, is cooled by the main airflow which is also used to cool the leading edge cavity.

Thus, the thermal heating of the airflow circulating in the main cavity is limited by the presence of the side cavity which protects the main cavity from the pressure side wall, being relatively hot. Controlling the thermal heating of the airflow circulating in the main cavity and cooling the airfoil walls forming the leading edge through impingement makes it possible to ensure a limited temperature of the airfoil at the leading edge.

Preferably, the first outlet ports are impingement cooling ports.

In this case, the main airflow comes out of the main cavity as jets projected on the walls of the airfoil forming the leading edge, thus allowing an impingement cooling of these walls at the leading edge.

In preferred embodiments of the invention, the airfoil further comprises a rear cavity, separated from the main cavity and from the side cavity, and configured to collect a rear airflow from the air inlet and circulate it in the airfoil and exhaust it from the rear cavity through fourth outlet ports.

Such a rear airflow, distinct from the main airflow and from the side airflow, can be exploited to cool the region of the airfoil close to the trailing edge.

Thus, the airfoil preferably comprises a first trailing edge cavity adjacent to the trailing edge, separated from the air inlet, and connected to the rear cavity through the fourth outlet ports so as to receive at least one portion of the rear airflow and circulate it in the airfoil and exhaust it from the first trailing edge cavity through fifth outlet ports.

In addition, the airfoil preferably includes a second trailing edge cavity adjacent to the trailing edge, adjacent to the first trailing edge cavity along the span direction, separated from the rear cavity, and configured to collect another rear airflow from the air inlet and circulate it in the airfoil and exhaust it from the second trailing edge cavity through sixth outlet ports.

The invention also relates to a turbine for an aircraft turbomachine, comprising at least one rotary disk provided with blades of the type described above.

The invention also relates to a turbomachine for an aircraft, comprising at least one turbine of the type described above.

The invention finally relates to a moulding kit for manufacturing a blade of the type described above, comprising a set of cores configured to form at least the main cavity and the side cavity of the airfoil.

BRIEF DESCRIPTION OF THE DRAWINGS

The invention will be better understood, and further details, advantages and characteristics of the same will appear upon reading the following description made by way of non-limiting example and in reference to the appended drawings in which.

DETAILED DISCLOSURE OF PREFERRED EMBODIMENTS

Figure 1:
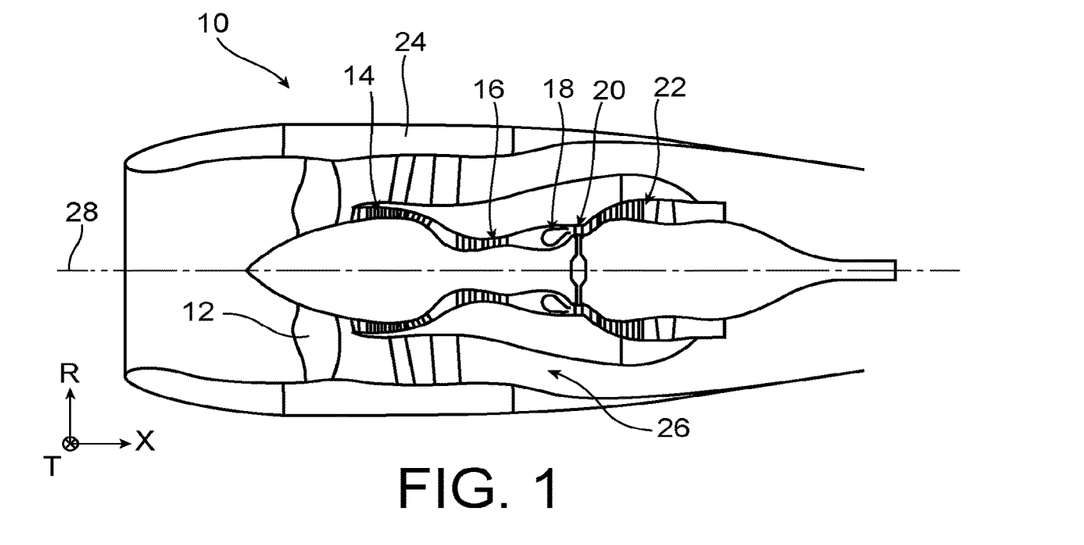
FIG. 1 is a schematic axial cross-section view of a turbomachine for an aircraft comprising a high pressure turbine provided with blades according to a preferred embodiment of the invention.

FIG. 1 illustrates a turbomachine 10 for an aircraft, for example a bypass twin-spool turbofan engine, generally including a fan 12 for sucking an airflow divided downstream of the fan into a primary flow supplying a core of the turbomachine and a secondary flow bypassing this core. The core of the turbomachine generally includes a low pressure compressor 14, a high pressure compressor 16, a combustion chamber 18, a high pressure turbine 20 and a low pressure turbine 22. The turbomachine is shrouded with a nacelle 24 surrounding the secondary flow channel 26. The rotors of the turbomachine are rotatably mounted about a longitudinal axis 28 of the turbomachine.

In the entire description, the axial direction X is the direction of the longitudinal axis 28 of the turbomachine, the radial direction R is at any point a direction orthogonal to the axial direction X and intersecting the same, and the tangential direction T is at any point orthogonal to both previous directions. On the other hand, the "upstream" and "downstream" directions are defined in reference to the general gas flow in the turbomachine.

Figure 2:
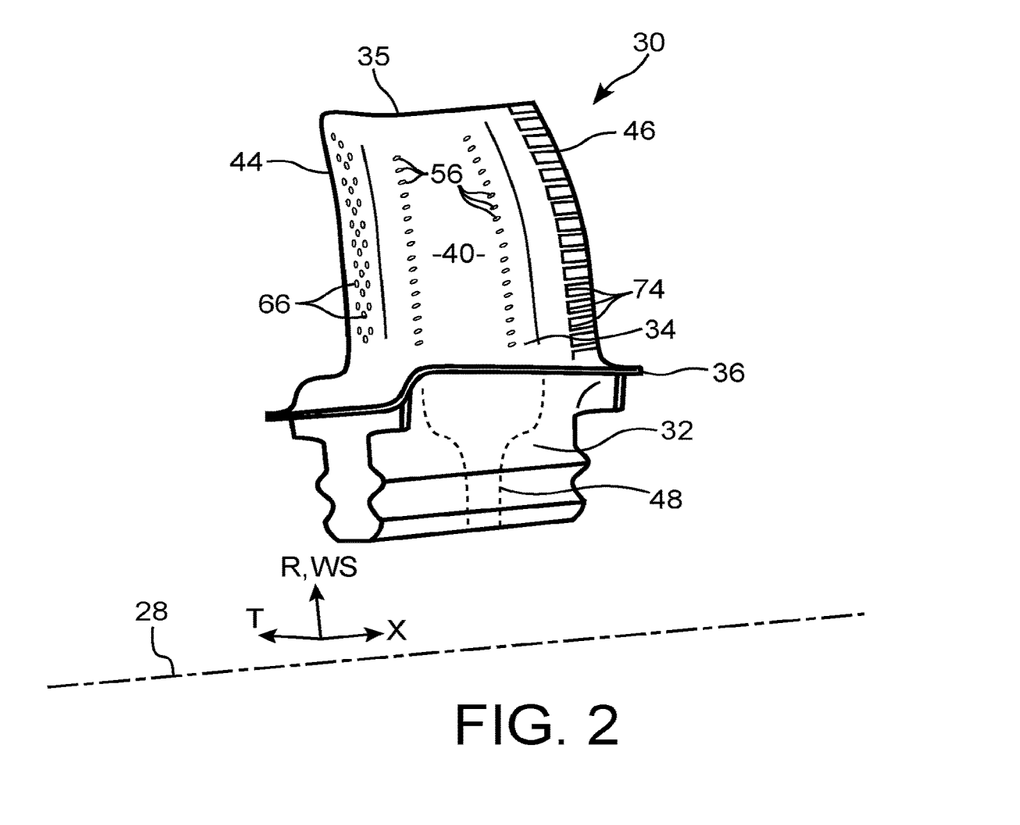
FIG. 2 is a schematic perspective view of a blade of the high pressure turbine of the turbomachine of FIG. 1.

FIG. 2 illustrates a blade 30 for an aircraft turbomachine turbine according to one preferred embodiment of the invention, for example a blade for a high pressure turbine, generally comprising a blade root 32 carrying an airfoil 34 terminating with an apex 35 of the blade on the side opposite to the blade root 32. The blade root includes a radially inner portion for enabling the blade to be retained by jointing in a rotor disk, in a known manner per se. In addition, the blade root is connected to the airfoil through an aerodynamic platform 36 for delimiting internally a primary flow channel within the turbine.

Figure 3:
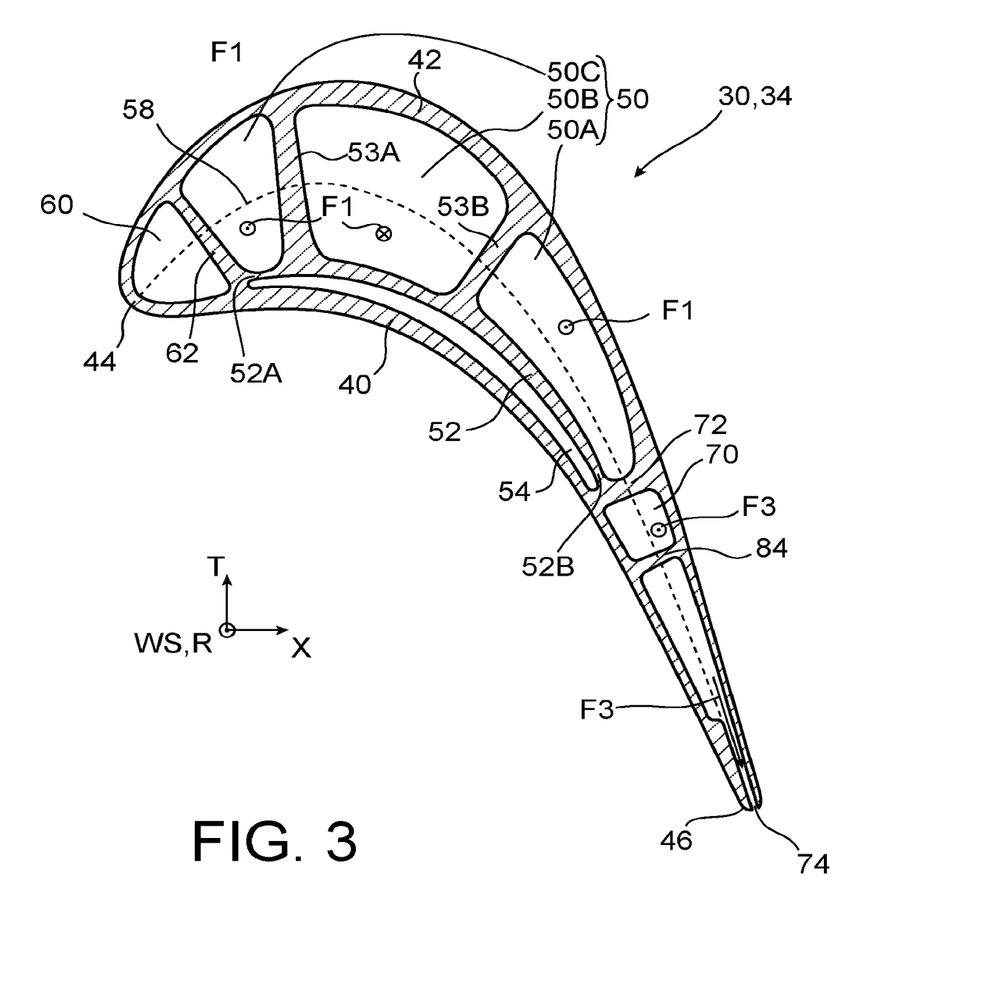
FIG. 3 is a schematic transverse cross-section view of the airfoil of the blade of FIG. 2.

In reference to FIGS. 2 and 3, the airfoil 34 generally includes a pressure side wall 40 and a suction side wall 42 connected to each other at a leading edge 44 and at a trailing edge 46 of the airfoil.

In FIGS. 2 and 3, the axial direction X corresponds to the direction of the longitudinal axis 28 of the turbomachine when the blade 30 is mounted to a rotor disk within the high pressure turbine 20. Under the same conditions, the direction from the blade root 32 to the apex 35 of the airfoil, called a span direction WS of the blade, coincides with the radial direction R.

The airfoil 34 generally comprises internal cavities each extending along the span direction WS of the airfoil, and configured for receiving and circulating cooling airflow taken in the blade through an air inlet 48 at the blade root 32 (FIG. 2).

Figure 5:
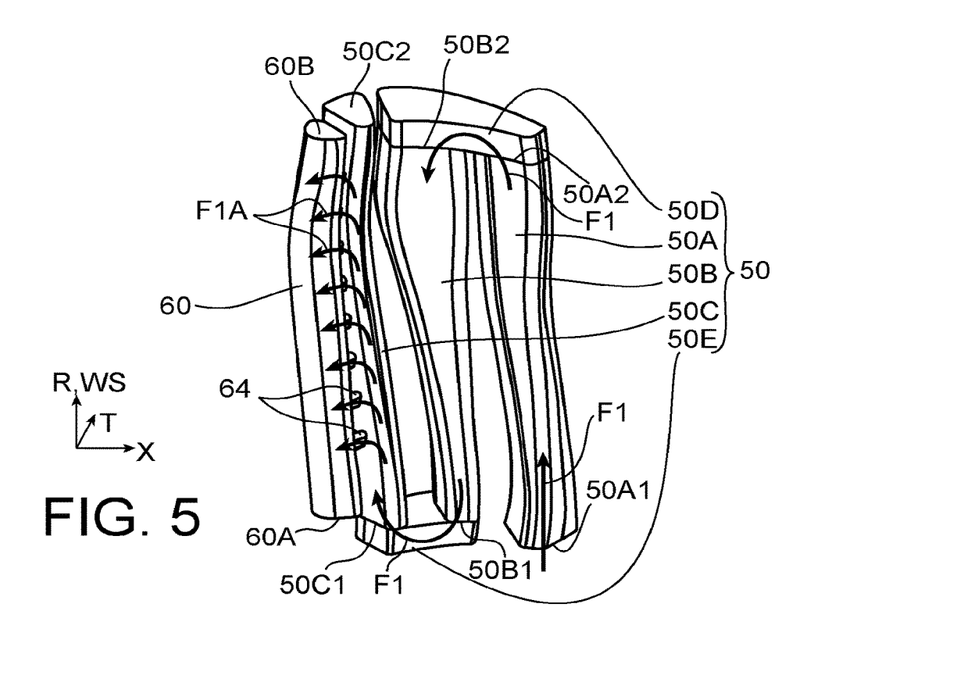
FIG. 5 is a view similar to FIG. 4, only illustrating part of the internal cavities.

The airfoil 34 comprises a main cavity 50, more particularly visible in FIG. 5, configured to collect a main airflow F1 from the air inlet 48 and circulate it in the airfoil 34 and exhaust from the main cavity through first outlet ports. The main cavity 50 includes three portions 50A, 50B, 50C connected to each other end-to-end so as to form a serpentine shape. Such a configuration enables the path length of the main airflow F1 to be maximised within the main cavity 50, and thus heat exchanges between the main airflow F1 and the walls delimiting the main cavity 50 to be maximised.

In the preferential example illustrated, each of the internal cavities has a dimension along the span direction WS higher than its extent according to any direction orthogonal to the span direction WS. Preferably, each of the internal cavities has a dimension along the span direction WS higher than several times its extent along any direction orthogonal to the span direction WS.

On the suction side, the three portions 50A, 50B, 50C are each delimited by the suction side wall 42, whereas on the pressure side, the three portions 50A, 50B, 50C are each delimited by a first internal wall 52 of the airfoil (FIG. 3).

In addition, the portions 50A and 50B are separated from each other by a second internal wall 53A connecting the suction side wall 42 to the first internal wall 52. Analogously, the portions 50B and 50C are separated from each other by a third internal wall 53B connecting the suction side wall 42 to the first internal wall 52.

Figure 4:
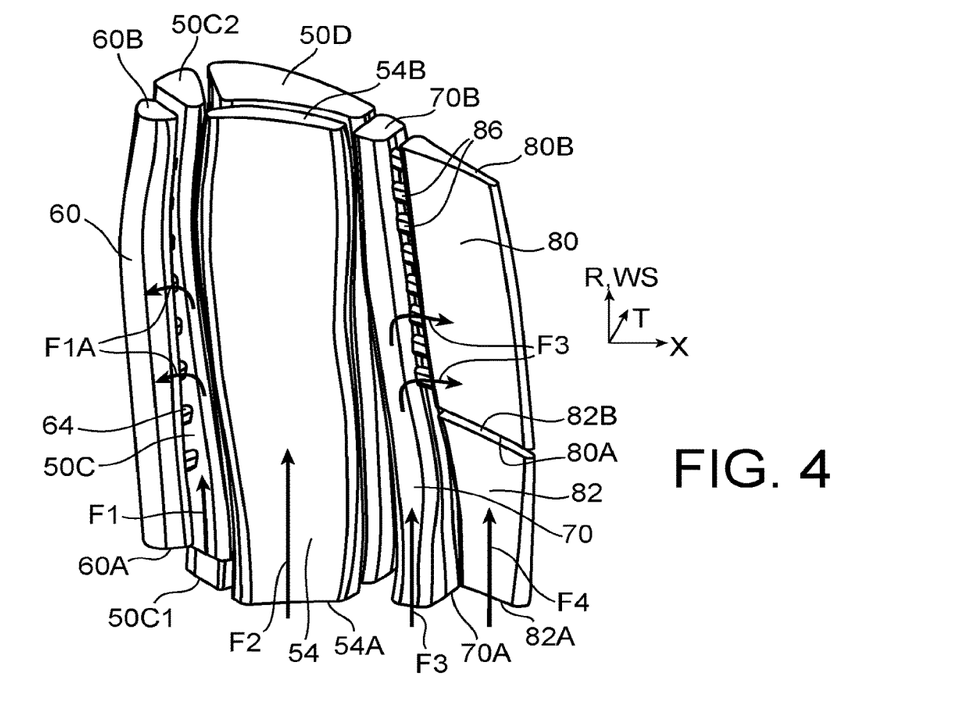
FIG. 4 is a schematic perspective view of internal cavities of the airfoil of the blade of FIG. 2.

The airfoil 34 further comprises a side cavity 54, more particularly visible in FIG. 4, configured to collect a side airflow F2 from the air inlet 48 and circulate it in the airfoil 34 and exhaust from the side cavity through second outlet ports 56. The side cavity 54 thus has a blade root side end 54A connected to the air inlet 48. In addition, the pressure side wall 40 includes the second outlet ports 56 enabling the side airflow F2 to exhaust from the blade (FIG. 2), and the side cavity 54 has a closed apex side end 54B.

The side cavity 54 is delimited, on the suction side wall side, by the first internal wall 52, and on the pressure side, by the pressure side wall 40 (FIG. 3).

Thus, the side cavity 54 is separated from the main cavity 50 by the first internal wall 52 of the airfoil.

The first internal wall 52 is a solid wall, thus prohibiting any air exchange between the side cavity 54 and the main cavity 50.

The side cavity 54 is in particular interposed between each of the three portions 50A, 50B, 50C of the main cavity, and the pressure side wall 40, so as to form a heat shield between the three portions 50A, 50B, 50C of the main cavity and the pressure side wall.

The side cavity 54 thus enables heating of the main airflow F1 to be limited within the main cavity 50 by the pressure side wall 40, which is generally hotter than the suction side wall 42 in use.

To that end, the side cavity 54 is preferably a so-called "thin" cavity, that is having a low thickness in comparison with the main cavity 50. Thus, the mean thickness of the side cavity 54 is preferentially lower than one third of the mean thickness of the main cavity 50. By "mean thickness", it is intended the extent measured perpendicular to the bend line 58 of the airfoil, averaged along said bend line and along the span direction WS.

Generally, the three portions 50A, 50B, 50C of the main cavity are thus adjacent to the suction side wall 42 whereas the side cavity 52 is adjacent to the pressure side wall 40.

The airfoil 34 further comprises a leading edge cavity 60 adjacent to the leading edge 44 (FIG. 3). This leading edge cavity 60 is separated from the air inlet 48, in that this cavity is not directly connected to the air inlet 48 but receives cooling air from the main cavity 50.

More particularly, the three portions of the main cavity 50 comprise a trailing edge side portion 50A connected to the air inlet 48 for taking in the main airflow F1, a leading edge side portion 50C connected to the leading edge cavity 60 so as to supply the same with cooling air, and an intermediate portion 50B connecting the trailing edge side portion 50A to the leading edge side portion 50C (FIGS. 3 and 5).

The trailing edge side portion 50A thus has a blade root side end 50A1 (that is a radially inner end) connected to the air inlet 48, and an apex side end 50A2 opening into a first connection 50D connected to an apex side end 50b2 of the intermediate portion 50B (FIG. 5).

In addition, the intermediate portion 50B has a blade root side end 50b1 opening into a second connection 50E connected to a blade root side end 50C1 of the leading edge side portion 50C.

Finally, the leading edge side portion 50C has a closed apex side end 50C2.

It is to be noted that the apex side end 54B of the side cavity 54 extends facing the first connection 50D and the apex side end 50C2 of the leading edge side portion 50C of the main cavity 50.

The leading edge cavity 60 is separated from the leading edge side portion 50C through a third internal wall 62, which connects the pressure side wall 40 to the suction side wall 42, and to which a leading edge side end 52A of the first internal wall 52 is connected (FIG. 3).

In the embodiment illustrated, communication of the leading edge side portion 50C with the leading edge cavity 60 is ensured by impingement cooling ports 64 formed in the third internal wall 62 (FIG. 5), and thus making up the aforementioned first outlet ports, in the terminology of the invention. The leading edge cavity 60 has a closed blade root side end 60A, and an apex side end 60B which is also closed.

In addition, the leading edge cavity 60 communicates with the outside of the blade by means of third outlet ports 66 formed in at least one of the pressure side 40 and suction side 42 walls in the proximity of the leading edge 44 (FIG. 2).

On the other hand, the airfoil 34 comprises a rear cavity 70 (FIGS. 3 and 4) separated from the main cavity 50 and from the side cavity 54, and configured to collect a rear airflow F3 from the air inlet 48 and circulate it in the airfoil and exhaust it from the rear cavity 70 by fourth outlet ports. The rear cavity 70 thus has a blade root side end 70A connected to the air inlet 48.

The separation between the rear cavity 70 on the one hand and the main cavity 50 and the side cavity 54 on the other hand is ensured by a fifth internal wall 72 of the airfoil, which is a solid wall connecting the pressure side wall 40 to the suction side wall 42, and to which a trailing edge side end 52B of the first internal wall 52 (FIG. 3) is connected.

The rear cavity 70 is thus delimited by the pressure side 40 and suction side 42 walls.

In preferred embodiments, the airfoil 34 finally includes at least one trailing edge cavity adjacent to the trailing edge 46, and communicating preferably with the outside of the blade through slots 74 opening into the trailing edge 46, in a known manner per se (FIG. 3).

In the example illustrated, the airfoil 34 includes two trailing edge cavities 80, 82 which are adjacent along the span direction WS of the blade. These two trailing edge cavities 80, 82 are separated from the rear cavity 70 by a sixth internal wall 84 of the airfoil connecting the pressure side wall 40 to the suction side wall 42 (FIG. 3).

Among both cavities, a trailing edge first cavity 80 (FIG. 4), disposed on the apex side 35 of the blade, is connected to the rear cavity 70 through calibrated ports 86 formed in the sixth internal wall 84, and thus making up the aforementioned fourth outlet ports, in the terminology of the invention. By "calibrated ports", it is intended ports the passage cross-section of which is chosen upon design to obtain a desired airflow rate, which is determined by the thermal behaviour of the blade in this region. The trailing edge first cavity 80 has a closed blade root side end 80A, and an apex side end 80B which is also closed. The trailing edge first cavity 80 is thus configured to receive at least one portion of the rear airflow F3 and circulate it in the airfoil and exhaust it from the trailing edge first cavity 80 by fifth outlet ports, made up by some of the slots 74.

A second trailing edge cavity 82, disposed on the side of the blade root 32, is separated from the rear cavity 70 by a solid portion of the sixth internal wall 84, and is configured to collect another rear airflow F4 directly from the air inlet 48 and circulate it in the airfoil and exhaust it from the second trailing edge cavity 82 through sixth outlet ports, made of other slots 74. The second trailing edge cavity 82 thus has a blade root side end 82A connected to the air inlet 48, and a closed apex side end 82B.

The blade 30 can be made by moulding, in a known manner per se.

To that end, a moulding kit for manufacturing a blade according to the invention comprises a set of cores configured to form the different cavities of the airfoil respectively.

Figure 6:
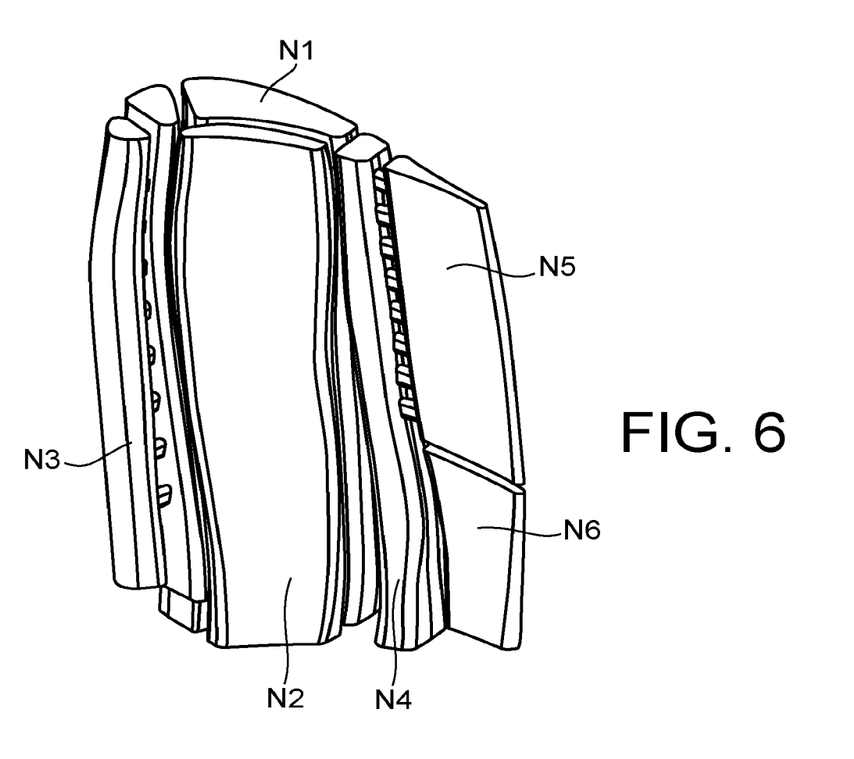
FIG. 6 is a schematic perspective view of a set of cores for forming the internal cavities of the airfoil of the blade of FIG. 2.
Figure 7:
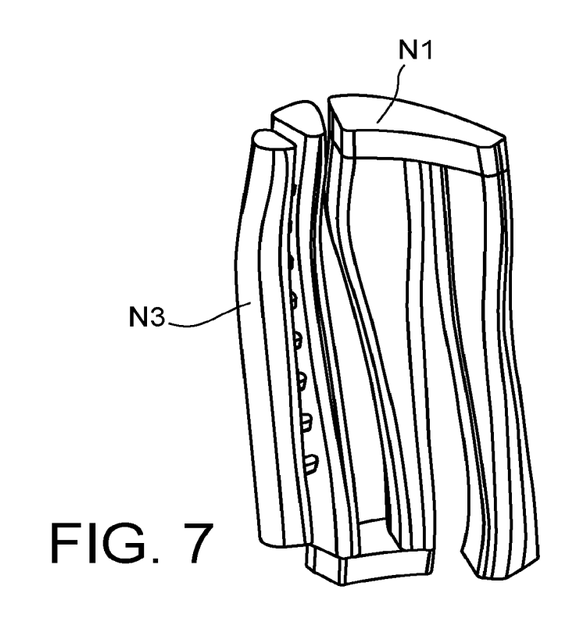
FIG. 7 is a view similar to FIG. 6, only illustrating part of the cores.

Such a set of cores, visible in FIG. 6, thus includes a serpentine-shaped main core N1 (more clearly visible in FIG. 7) having the form of the main cavity 50, a side core N2 having the form of the side cavity 54, a leading edge core N3 having the form of the leading edge cavity 60, a rear core N4 having the form of the rear cavity 70, a trailing edge first core N4 having the form of the trailing edge first cavity 80, and a second trailing edge second core N5 having the form of the second trailing edge cavity 82.

In use, the main airflow F1 (FIG. 5) penetrates the trailing edge side portion 50A of the main cavity 50 through its blade root side end 50A1, and circulates radially outwardly up to the first connection 50D, and then penetrates the intermediate portion 50B and circulates radially inwardly in the same, up to the second connection 50E. The main airflow F1 then radially rises outwardly in the leading edge side portion 50C and penetrates the impingement cooling ports 64 (or first outlet ports), of which it comes out as impingement jets F1A within the leading edge cavity 60. The main airflow F1 finally exhausts from the blade by passing through the third outlet ports 66 close to the leading edge 44.

The main airflow F1 thus allows cooling of the suction side wall 42 by circulating along the three portions 50A, 50B, 50C of the main cavity, as well as impingement cooling of the walls 40 and 42 of the airfoil at the leading edge 44, by taking the form of a plurality of impingement jets F1A at the outlet of the impingement cooling ports 64.

On the other hand, the side airflow F2 (FIG. 4) penetrates the side cavity 54 through the blade root side end 54A thereof, and then this flow circulates radially outwardly and is distributed into the second outlet ports 56 (FIG. 2) so as to exhaust from the airfoil 34. The side airflow F2 enables the first internal wall 52 to be cooled and thus a heat shield to be formed between the pressure side wall 40 and the main cavity 50, contributing in that the main airflow F1 remains relatively fresh when it reaches the impingement cooling ports 64.

Hence, the invention enables the necessary flow rate to be limited as regards the main airflow F1, while ensuring an optimum cooling of the suction side wall 42 and the region of the pressure side 40 and suction side 42 walls close to the leading edge 44, through the main airflow F1, as well as an optimum cooling of the pressure side wall 40 through the side airflow F2.

Further, the rear airflow F3 (FIG. 4) penetrates the rear cavity 70 through the blade root side end 70A thereof, and then this flow circulates radially outwardly and is distributed into the different calibrated ports 86 (or fourth outlet ports) through which this flow penetrates the trailing edge first cavity 80. The rear airflow F3 then exhausts from the airfoil by passing through the slots 74 or fifth outlet ports (FIG. 3) communicating with the trailing edge first cavity 80.

The other rear airflow F4 penetrates the second trailing edge cavity 82 through the blade root side end 82A thereof, and circulates radially outwardly so as to be distributed into the slots 74 or sixth outlet ports communicating with the second trailing edge cavity 82, and then to thus exhaust from the airfoil 34.

Other configurations of the blade 30 are possible without departing from the scope of the present invention defined by the set of appended claims.

For example, the blade 30 can include three intermediate portions connected in series so as to form themselves a serpentine shape connecting the trailing edge side portion 50A to the leading edge side portion 50C. In this case, a median intermediate portion among these three intermediate portions can be connected to the air inlet 48 much like the trailing edge side portion 50A, so as to improve controlling heating of the airflow circulating in the serpentine shape. The connection of the median intermediate portion to the air inlet 48 is preferably configured to let an airflow rate higher than the flow rate of the connection of the trailing edge side portion 50A to the air inlet 48 pass.

The invention claimed is:

1. A blade for an aircraft turbomachine turbine, comprising a blade root comprising at least one air inlet, and an airfoil carried by the blade root and extending along a span direction of the blade terminating in an apex of the blade, the airfoil having a pressure side wall, and a suction side wall connected to the pressure side wall at a leading edge and a trailing edge of the airfoil, and the airfoil comprising:
   a main cavity configured to collect a main airflow from the air inlet and circulate it in the airfoil and exhaust it from the main cavity by first outlet ports, and
   a side cavity interposed between the main cavity and the pressure side wall and separated from the main cavity, the side cavity being configured to collect a side airflow from the air inlet and circulate it in the airfoil and exhaust it from the side cavity by second outlet ports, and
   a leading edge cavity adjacent to the leading edge and separated from the air inlet, and third outlet ports through which the leading edge cavity communicates with the outside of the blade,
   wherein the main cavity includes at least three portions connected to each other end-to-end so as to form a serpentine shape, the side cavity being interposed between each of the portions and the pressure side wall,
   wherein the portions of the main cavity comprise a trailing edge side portion connected to the air inlet, a leading edge side portion, and at least one intermediate portion connecting the trailing edge side portion to the leading edge side portion, and
   wherein the leading edge side portion is connected to the leading edge cavity by the first outlet ports so as to supply the leading edge cavity with cooling air.

2. The blade according to claim 1, wherein the mean thickness of the side cavity is lower than one third of the mean thickness of the main cavity.

3. The blade according to claim 1, wherein the portions of the main cavity are adjacent to the suction side wall.

4. The blade according to claim 1, wherein the first outlet ports are impingement cooling ports.

5. The blade according to claim 1, wherein the airfoil further comprises a rear cavity, separated from the main cavity and from the side cavity, and configured to collect a rear airflow from the air inlet and circulate it in the airfoil and exhaust it from the rear cavity by fourth outlet ports.

6. The blade according to claim 5, wherein the airfoil further comprises a first trailing edge cavity which is:
   adjacent to the trailing edge,
   separated from the air inlet, and
   connected to the rear cavity through the fourth outlet ports so as to receive at least part of the rear airflow and circulate it in the airfoil and exhaust it from the first trailing edge cavity through fifth outlet ports.

7. The blade according to claim 6, wherein the airfoil further includes a second trailing edge cavity which is:
   adjacent to the trailing edge,
   adjacent to the first trailing edge cavity along the span direction,
   separated from the rear cavity,
   configured to collect another rear airflow from the air inlet and circulate it in the airfoil and exhaust it from the second trailing edge cavity through sixth outlet ports.

8. The blade according to claim 1, configured such that the side airflow takes part only in cooling of the pressure side wall, and such that the main airflow cools the suction side wall and the leading edge cavity.

9. A turbine for an aircraft turbomachine, wherein the turbine comprises at least one rotary disk provided with blades according to claim 1.

10. A turbomachine for an aircraft, wherein the turbomachine comprises at least one turbine according to claim 9.

* * * * *

UNITED STATES PATENT AND TRADEMARK OFFICE
CERTIFICATE OF CORRECTION

PATENT NO. : 11,286,788 B2
APPLICATION NO. : 16/615328
DATED : March 29, 2022
INVENTOR(S) : Leandre Ostino et al.

It is certified that error appears in the above-identified patent and that said Letters Patent is hereby corrected as shown below:

In the Specification

In Column 5, Line 48, delete "50b2" and insert -- 50B2 --, therefor.

In Column 5, Line 51, delete "50b1" and insert -- 50B1 --, therefor.

Signed and Sealed this
Fifth Day of July, 2022

Katherine Kelly Vidal
*Director of the United States Patent and Trademark Office*